(12) United States Patent
Rake et al.

(10) Patent No.: US 10,100,926 B2
(45) Date of Patent: Oct. 16, 2018

(54) DEVICE FOR MOVING AN OPERATING ELEMENT OF AN AUTOMATIC TRANSMISSION OF A VEHICLE INTO A PARK POSITION, METHOD FOR OPERATING SUCH A DEVICE, AND SHIFTING DEVICE FOR SHIFTING AN AUTOMATIC TRANSMISSION OF A VEHICLE

(71) Applicants: ZF Friedrichshafen AG, Friedrichshafen (DE); Lemförder Electronic GmbH, Espelkamp (DE)

(72) Inventors: Ludger Rake, Steinfeld (DE); Andreas Giefer, Lemfoerde (DE); Sascha Rosentreter, Espelkamp (DE); Ralf Hartrampf, Wagenfeld (DE)

(73) Assignees: ZF FRIEDRICHSHAFEN AG, Friedrichshafen (DE); LEMFÖRDER ELECTRONIC GMBH, Espelkamp (DE)

( * ) Notice: Subject to any disclaimer, the term of this patent is extended or adjusted under 35 U.S.C. 154(b) by 402 days.

(21) Appl. No.: 15/029,755

(22) PCT Filed: Sep. 17, 2014

(86) PCT No.: PCT/EP2014/069764
§ 371 (c)(1),
(2) Date: Apr. 15, 2016

(87) PCT Pub. No.: WO2015/055370
PCT Pub. Date: Apr. 23, 2015

(65) Prior Publication Data
US 2016/0245403 A1 Aug. 25, 2016

(30) Foreign Application Priority Data
Oct. 17, 2013 (DE) .................. 10 2013 221 041

(51) Int. Cl.
*F16H 61/22* (2006.01)
*F16H 59/08* (2006.01)

(52) U.S. Cl.
CPC ............. *F16H 61/22* (2013.01); *F16H 59/08* (2013.01); *F16H 2059/081* (2013.01)

(58) Field of Classification Search
CPC ......................... F16H 59/08; F16H 2059/081
See application file for complete search history.

(56) References Cited

U.S. PATENT DOCUMENTS 4,378,474 A * 3/1983 Olson .................... B60K 37/06
200/12
2006/0037424 A1 2/2006 Pickering et al.
(Continued)

FOREIGN PATENT DOCUMENTS

DE 10 2004 041 087 A1 3/2006
DE 10 2006 007 600 A1 8/2007
(Continued)

OTHER PUBLICATIONS

German Office Action dated Jul. 18, 2014 for German Patent Application No. DE 10 2013 221 041.8 (German language), 7 pages.
(Continued)

*Primary Examiner* — Terence Boes
(74) *Attorney, Agent, or Firm* — Brinks Gilson & Lione (57) ABSTRACT

A device for shifting an operation element of an automatic transmission of a vehicle in a parking position includes a rotationally mounted locking comb directly coupled with the operation element, with a stop member, a locking pin which is designed in a first position to fix the locking comb and in a second position to release the locking comb for a rotational movement, and a rotationally mounted set collar with a switching cam and a catch, wherein the switching cam is
(Continued)

formed at a rotational movement of the set collar to move the locking pin from the first position to the second position, and the catch is formed at the rotational movement of the set collar to entrain the stop member to turn the locking comb so far that the operation element is shifted to the parking position.

20 Claims, 5 Drawing Sheets

(56) References Cited

U.S. PATENT DOCUMENTS

| | | | | |
|---|---|---|---|---|
| 2014/0345409 | A1* | 11/2014 | Watanabe | F16H 59/08 74/473.3 |
| 2016/0238128 | A1* | 8/2016 | Rake | F16H 59/08 |
| 2016/0245396 | A1* | 8/2016 | Behounek | F16H 59/08 |
| 2016/0312882 | A1* | 10/2016 | Heo | F16H 59/08 |
| 2017/0175884 | A1* | 6/2017 | Watanabe | F16H 59/08 |
| 2018/0038478 | A1* | 2/2018 | Arakawa | B60K 20/02 |

FOREIGN PATENT DOCUMENTS

| | | |
|---|---|---|
| DE | 10 2007 042 113 A1 | 3/2009 |
| EP | 1 657 475 A2 | 5/2006 |
| EP | 2 660 091 A1 | 11/2013 |
| KR | 2010 0090826 A | 8/2010 |
| WO | WO 2006/021198 A1 | 3/2006 |
| WO | WO 2012/090954 A1 | 7/2012 |
| WO | WO 2013/123375 A2 | 8/2013 |

OTHER PUBLICATIONS

English translation of page 7 of German Office Action dated Jul. 18, 2014 for German Patent Application No. DE 10 2013 221 041.8 (2 pages).

International Search Report and Written Opinion dated Dec. 22, 2014 for PCT/EP2014/069764 (German language, 10 pages).

International Search Report dated Dec. 22, 2014 for PCT/EP2014/069764 (English language, 3 pages).

* cited by examiner

DEVICE FOR MOVING AN OPERATING ELEMENT OF AN AUTOMATIC TRANSMISSION OF A VEHICLE INTO A PARK POSITION, METHOD FOR OPERATING SUCH A DEVICE, AND SHIFTING DEVICE FOR SHIFTING AN AUTOMATIC TRANSMISSION OF A VEHICLE

RELATED APPLICATIONS

This application is a filing under 35 U.S.C. § 371 of International Patent Application PCT/EP2014/069764, filed on Sep. 17, 2014, and claims the priority of German Patent Application DE 10 2013 221 041.8, filed Oct. 17, 2013, both of which are incorporated by reference herein in their entirety.

BACKGROUND

1. Technical Field

The present invention relates to a device for shifting an operation element of an automatic transmission of a vehicle to a parking position, a method for operating a device for shifting an operation element of an automatic transmission of a vehicle to a parking position and a shifting device for shifting an automatic transmission of a vehicle.

2. Background Information

In the automotive sector are known shifting mechanisms for automatic transmission with multi-stable switch positions, such as P, R, N, D and partially also equipped with a so-called "AutoP" function, i.e., an automatic transmission-side parking lock. Here, when the parking lock has been engaged in the transmission, the P position is also immediately engaged in the shifting mechanism by means of an actuator. At the resetting, e.g. the gearshift lever or the turning knob of the shifting mechanism and thus the locking pin is fixed, and then the locking mechanism is turned back over the locking pin to the P position by means of an electrical motor. Subsequently, the fixation of the gearshift lever is cancelled and the driver can shift from the new P position to any switch position, e.g. R, N, D.

DE 10 2006 007 600 A1 discloses a rotary actor device for electrical or electronic devices in a vehicle.

BRIEF SUMMARY

Against this background, the present invention provides an improved device for shifting an operation element of an automatic transmission of a vehicle to a parking position, an improved method for operating a device for shifting an operation element of an automatic transmission of a vehicle to a parking position and improved shifting device for shifting an automatic transmission of a vehicle.

The addition of a reset ring to an automatic transmission-shifting device, which is especially characterized by a switching cam for proper movement of the locking pin, allows a decoupling of the locking pin and the locking mechanism at a resetting of the gearshift lever from an autoP function to a parking position.

Based on the decoupling, where the locking pin is no longer engaged with the locking mechanism, the gearshift lever can be reset without a disturbing locking noise. In addition, due to the movable locking pin, when resetting, no locking moments need to be overcome. So, the torque or resetting torque of the actuator can be cost-effectively reduced.

A device for shifting an operation element of an automatic transmission of a vehicle to a parking position comprises a rotationally mounted locking comb directly connected with the operation element with a stop member, a locking pin, which is designed to fix the locking comb in a first position and to release the locking pin in a second position for rotational movement, and a rotationally mounted set collar with a switching cam and a catch, wherein the switching cam is formed to move the locking pin from the first position to the second position at a rotational movement, and the catch is formed to entrain the stop member at a rotational movement of the set collar in order to turn the locking comb for shifting the operation element to the parking position. The locking comb can be turned so far that the operation element is shifted to the parking position.

The device can be a device or part of a device of the vehicle. The vehicle can be a road-bound vehicle, such as a passenger car or a truck. The operation element can be a ring or gearshift lever of the automatic transmission, which can for example be operated by the driver of the vehicle by hand to engage various gears of the automatic transmission. Accordingly, by setting the parking position at the operation element, the automatic transmission can be, for example, locked to prevent the vehicle from rolling away. Moreover, the operation element can comprise further possible positions, such as D for drive, R for reversing and N for shifting the transmission into neutral, which can be set manually by the driver by turning or pushing the operation element and by which the transmission can be shifted in the desired manner. The locking comb serves to transmit an operation of the operating member to the automatic transmission and can be coupled by mechanical connecting means to the operation element such that a movement of the operation element induces a uniform, parallel movement or rotation of the locking comb and vice versa, the rotation of the locking comb induces a corresponding rotation of the operation element.

In particular when the operation element is designed in the form of a turning knob, the locking comb can be ring-shaped and arranged parallel to a plane of rotation of the operation element. The locking comb can comprise a circumferential locking contour characterized by a plurality of comb-like arranged elevations, over which in conjunction with the locking pin a movement of the operation element to a switch position of the automatic transmission can be implemented. The stop member can be arranged between the elevations of the locking comb and can comprise a face extending vertically to a rotation plane of the locking comb. The locking pin can be designed so that in a first position it fixes the locking comb by engaging in the locking contour, and in the second position it releases the locking comb by a movement out of the locking contour. The set collar can be formed as a disk with a central bore-hole. The set collar can be arranged in the device parallel to the locking comb. The switching cam of the set collar can be formed on an outer contour of the set collar in the form of a rounded protrusion, while the catch of the set collar can be formed on an inner contour of the set collar. The catch can in particular comprise a counter surface for abutting against the face of the stop member, and the formation of a crosspoint between the set collar and the locking comb. The switching cam and the catch can be formed integrally with the set collar.

According to one embodiment, the device can further comprise a spring element connected with the locking pin. Accordingly, the switching cam can be formed to move the locking pin against a force of the spring element from the first position to the second position. The spring element can be formed to move the locking pin from the second position back to the first position. This embodiment provides a simple, robust and cost-effective way to move the locking pin between the two positions.

For example, the device can be constructed such that the locking comb is arranged between the set collar and the operation member and the locking pin is arranged radially with respect to the locking comb and the set collar and is further configured to be moved between the first position and the second position in the radial direction relative to the locking comb and the set collar. By the sandwich-type arrangement of the locking comb between the set collar and the operation element every rotation of the set collar can be advantageously transmitted to the operation element as directly as possible and with low loss. The radial arrangement of the locking pin in relation to the locking comb can be designed such that the locking pin passes through the circular shaped locking comb at two diametrically opposed positions. This arrangement of the locking pins in relation to the locking comb is particularly functional, in particular because the locking comb can be fixed or released in two places.

According to a further embodiment, the locking pin can comprise a projection and be designed to be moved from the first position to the second position at a turning of the set collar over a receptacle of the projection on the switching cam. This embodiment provides a particularly simple and inexpensive possibility to transmit the rotational movement of the set collar to the linear movement of the locking pin.

In particular, the catch and the switching cam can be formed offset relative to the catch for forming an approach of the switching cam. So during the rotational movement of the set collar, first the pin can be moved from the first position to the second position by means of the cam of the locking pin and then the stop element can be entrained by the catch in the direction of rotation. An approach of the switching cam designed in such a simple way in relation to the catch allows a smooth operational sequence of the device. The switching cam can be formed for example by a section of the set collar, which is characterized by a greater radial expansion of the set collar than in a remaining section of the set collar. Here, with respect to a direction of rotation of the set collar an initial section of the switching cam can be characterized by a beveled shaped first transition between the section and the remaining section and the end section of the switching cam can be characterized by a stepped shaped second transition between the section and the remaining section. In this manner, the transition to the switching cam can be formed gradual in a simple way, while the transition from the switching cam to the remaining section of the set collar can be formed abrupt. With this advantageous formation of the switching cam, the locking pin can be received by the switching cam over the tapered initial section without noise and the risk of jamming and moved to the second position. By means of the spring force, the locking pin can be more safely and quickly moved over the step-like end section of the switching cam to the first position and thus safely fix the locking comb again.

According to a further embodiment, the device can further comprise a coupling element which connects the set collar with an actuator. The coupling element can be configured to transmit a torque of the actuator to the set collar to produce the rotation of the set collar. The coupling element can be configured for example as a gear, which can be arranged in a parallel plane to the set collar and can be directly or indirectly connected to it. The actuator can be for example an electrical motor. With this embodiment, a movement of the electrical motor can be transformed in a simple and economical manner into a movement of the set collar.

Of course, the set collar can comprise at least one other switching cam and at least one other catch. For example, another switching cam can be disposed diametrically opposite to the switching cam and also another catch can be arranged diametrically opposite to the catch on the set collar. With this embodiment, the locking comb can be advantageously rotated back to a required degree even more evenly and smoothly and especially with less time and energy.

A shifting device for shifting an automatic transmission of a vehicle has the following characteristics: an operation element that is adapted to be shifted between a parking position of the automatic transmission and at least one driving position of the automatic transmission; and a device for shifting the operation element according to one of the preceding embodiments, wherein the locking comb of the device is designed to be directly connectable or connected to the operation element.

The operation element can be designed, for example, as a turning knob and adapted to be operated by a driver of the vehicle. For this purpose, the operation element can have at different positions markings indicating to the driver how far and in which direction the operation element must be rotated to shift the different gears and show it the position in which the automatic transmission of the vehicle is currently. So the parking position can be marked with "P". Other positions can be marked on the operating device with "D" for a transmission position "drive", "R" for a transmission position "reverse" and with "N" for idling.

A method for operating a device for shifting an operation element of an automatic transmission of a vehicle to a parking position, the device comprising a rotationally mounted locking comb directly connected with the operation element with a stop member, a locking pin, which is designed so that in a first position it can fix the locking comb and release it in a second position for rotational movement, and further comprises a rotationally mounted set collar with a switching cam and a catch, includes the following step: Rotating the set collar to move the locking pin from the first position to the second position by means of the switching cam and entraining the stop member by means of the catch in order to rotate the locking comb so far that the operation element is shifted to the parking position.

The method can be advantageously implemented using said device.

BRIEF DESCRIPTION OF THE DRAWINGS

The invention is explained in closer detail based on the accompanying drawings. The figures show.

DETAILED DESCRIPTION OF THE DRAWINGS AND THE PRESENTLY PREFERRED EMBODIMENTS

In the following description of preferred embodiments of the present invention, same or similar reference numerals are used for similarly acting elements shown in the various figures, with a repeated description of these elements being dispensed with.

Figure 1:
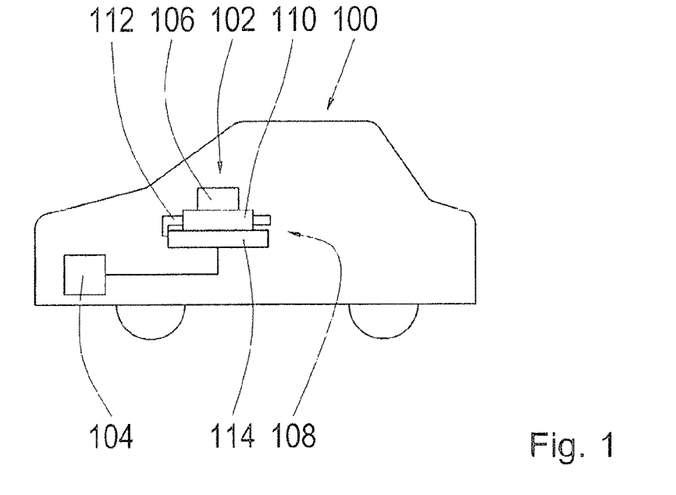
FIG. 1 shows a schematic representation of a shifting device for shifting an automatic transmission of a vehicle, according to an embodiment of the present invention.

FIG. 1 shows by way of schematic representation a vehicle 100 with a shifting device 102 according to an embodiment of the present invention. The shifting device 102 is formed for shifting an automatic transmission 104 of the vehicle 100 and is composed of an operation element 106 and a device 108 for shifting the operation element 106. The device 108 is coupled to the operation element 106.

This allows to transmit an actuation of the operation element 106 by a driver of the vehicle to the automatic transmission 104. On the other hand, the operation element 106 can be moved to a parking position, when the automatic transmission 104 assumes an autoP state. In this way, a state of the automatic transmission 104 can be brought in line with the position of the operation element 106.

For this purpose, the device 108 includes a rotationally mounted locking comb 110 directly coupled with the operation element 106 with a stop member (not shown here) stop member, a locking pin 112 and a rotationally mounted set collar 114. The locking pin 112 is spring-loaded and is designed in a first position to fix the locking comb 110 and, in a second position, to release the locking comb for rotational movement. The shifting of the locking pin 112 between the first and the second positions is brought about by a rotation of the set collar 114, which for this purpose has a switching cam (not shown here). After the position shifting of the locking pin 112, by means of a catch (also not shown in the illustration in FIG. 1) of the set collar 114, the locking comb 110 is entrained at the stop member and turned so far that the operation element 106 is moved to the parking position.

Figure 2:
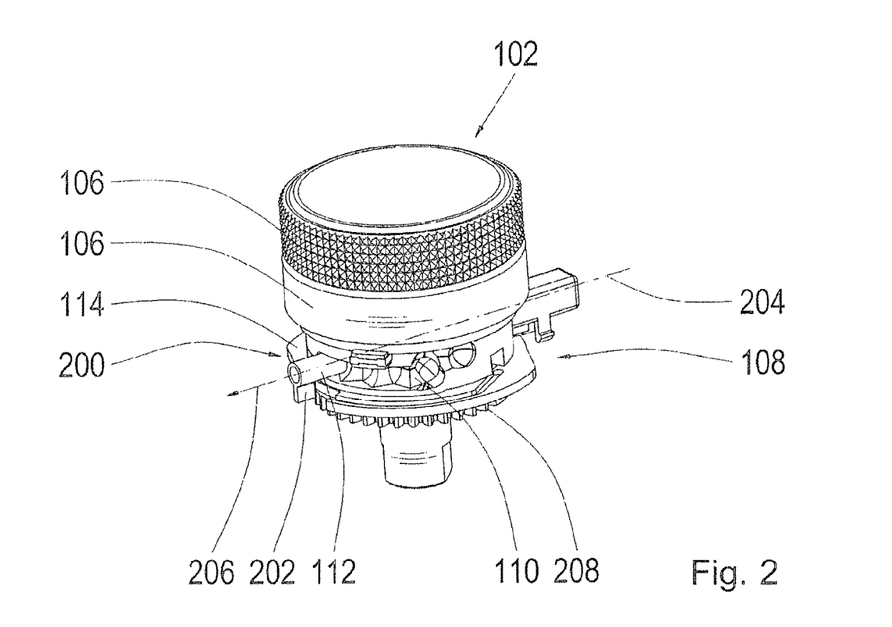
FIG. 2 shows a perspective view of the shifting device of FIG. 1, according to an embodiment of the present invention.

FIG. 2 shows a perspective view of an embodiment of the shifting device 102 in greater detail. The operation element 106 coupled with the apparatus 108 is designed to be handled by a driver of the vehicle in which the shifting device 102 is installed to set various gears in the vehicle's automatic transmission with the shifting device 102. In the embodiment of the shifting device 102 shown in the diagram in FIG. 2, the operation element 106 is designed as a turning knob and accordingly has a cylindrical shape. According to the embodiment as a turning knob, a switching operation of the shifting device 102 is performed by rotating the operation element 106. For this purpose, a section of the cylindrical wall of the operation member 106 has a corrugated surface for better gripping. In order to make the shifting easier for the operator, the operation element 106 usually shows letter symbols, which e.g. can be arranged on a surface of the operation element 106 clearly visible to the operator.

Thus, the turning knob 106 can indicate at various positions e.g. the symbols "P" for parking, "D" for driving, "R" for reverse and "N" for neutral. In the view of the shifting device 102 in FIG. 2, these symbols were omitted for clarity. The goal of the presented inventive device 108 is to transfer a parking lock of the automatic transmission connected with the shifting device 102 to the operation element 106 in that the operation element is shifted from any gear position to the P position for parking.

As the illustration in FIG. 2 shows, the locking comb 110 is arranged adjacent to the operation element 106 in a plane parallel to the plane of the operation element and directly coupled to the operation element 106. The locking comb 110 has a cylindrical or annular shape and is in the volume slightly smaller than the operation element 106. The locking comb 110 is rotationally mounted in the apparatus 108. A contour of the locking combs 110 clearly visible in FIG. 2 allows accurate engagement of the gear on the operation element 106. The locking pin 112 is arranged radially opposite the locking comb 110 and passes through the locking comb 110 at two diametrically opposite positions. The locking pin 112 is designed in a first position to lock the locking comb 110 and, in a second position, to release the locking comb 110 for rotational movement. The locking pin 112 is connected to a spring element of the device 108 not shown in the illustration in FIG. 2, which is designed to hold by spring force the locking pin 112 in the first position or to move it. Adjacent to the locking comb 110 and in a plane parallel to the plane of the locking comb 110, the device 108 comprises the also rotationally mounted set collar 114. By means of the switching cam 200 of the set collar 114 visible in a section of the illustration in FIG. 2, during a rotational movement of the set collar 114 of the locking pin 112 against a spring force of the spring element acting on the locking pin 112, the locking pin 112 is brought to the second position, in which the locking pin 112 releases the locking comb 110 for rotational movement. For this purpose, the locking pin 112 has a projection 202 which is arranged at one end of the locking pin 112 and extends transversely to the direction of extension of the locking pin 112 in the plane of rotation of the set collar 114. Thus, at a rotational movement of the set collar, the locking pin 112 is received by the projection 202 of the switching cam 200 and moved radially or along a main direction 204 of the locking pin 112 marked by a dashed line in the illustration in FIG. 2. In the embodiment shown in the illustration, the projection 202 is formed integrally with the locking pin 112. In the state of the shifting device 102 shown in FIG. 2, the locking pin 112 is in the first position and would be moved to the second position as a result of the rotation of the set collar 114 with entrainment by the cam 200 in a direction 206 indicated by an arrow against the spring force.

As the illustration in FIG. 2 shows, the device 108 comprises at its lower end a coupling element 208, which is designed to transmit a torque of an actuator for moving the operation element 106 to the set collar to create the rotation of the set collar. The coupling element 208 is designed here as a gear which is arranged fixed with a main side to the set collar 114. On one free side opposite to the main side, the coupling element 208 can be connected to an electrical motor, whose torque is transmitted by the coupling element to the set collar and thus ultimately to the operation element.

As already explained, the turning knob or the gear shift lever 106 is rotationally mounted and connected directly to the locking comb or the locking mechanism 110. The spring-loaded locking pin 112 is fixedly arranged in a housing of the device 108 not shown here. At AutoP, the gearshift lever 106 including the locking mechanism 110 is turned back indirectly over the reset ring 114 by means of the coupling element 208 connected to a motor or other electrical actuator. The precise functional sequence for turning back the operation element 106 is discussed in detail in the following figures.

Figure 3:
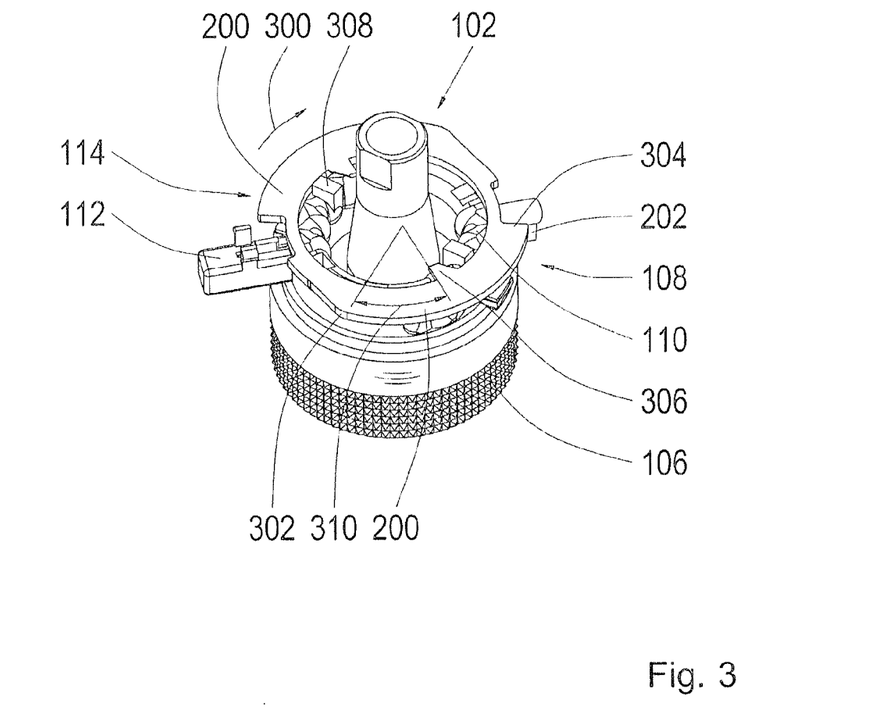
FIG. 3 shows a perspective bottom view of the shifting device of FIG. 2 with not retracted locking pin, according to an embodiment of the present invention.

FIG. 3 shows the shifting device 102 of FIG. 2 in a perspective view from below. The coupling element has been omitted here so that the set collar 114 and the locking comb 110 significant for the functionality of the inventive device 108 are clearly visible here. As the diagram in FIG. 3 shows, the set collar 114 is formed as a disk with a large central through hole.

The switching cam 200 is formed in an outer contour of the set collar 114 by a section which is characterized by a greater radial expansion of the set collar 114 than in a remaining section of the set collar 114. In relation to a direction of rotation 300 of the set collar 114 marked by an arrow, the switching cam 200 has differently formed initial and end sections. As is well seen from the illustration, an initial section 302 of the switching cam 200 is formed beveled, while an end section 304 of the switching cam 200 in an abrupt step merges into a remaining section of the set collar 114 not having the switching cam 200. As is clearly shown in FIG. 3, the embodiment of the shifting device 102 shown here comprises a further switching cam 200. The two switching cams 200 are formed identical and arranged diametrically opposite each other on the set collar 114.

In the illustration in FIG. 3 is further seen the catch 306 formed on an inner contour of the set collar 114. The catch 306 is adapted to abut a stop member 308 of the locking comb 110 during the rotational movement 300 of the set collar 114 and entrain it in continuous rotational movement 300 and so to rotate the locking comb 110. The catch 306 and the switching cam 200 of the set collar 114 are formed integrally with the set collar 114. The stop member 308 is rectangular shaped and inserted between the rounded locking contour of the locking combs 110. The stop member 308 is formed integrally with the locking comb 110. In the embodiment shown in FIG. 3, the locking comb 110 comprises a further stop member 308, which is arranged on the locking contour diametrically opposite to the stop member 308.

From the illustration in FIG. 3 can be clearly seen that to form an approach 310 of the switching cam 200, the switching cam 200 and the catch 306 are formed on the set collar 114 offset by a predetermined angle against the catch 306. By the approach 310 it is ensured that the locking pin 112 has first fully released the locking comb 110 before the locking comb 110 is rotated by means of the catch 306 of the set collar 114.

In the illustration in FIG. 3 is shown a functional state of the shifting device 102, in which the locking pin 112 is located in the first position and so it is not retracted. The projection 202 of the locking pin 112 is located on the remaining section of the set collar 114 not having the switching cam 200, is held in the first position by spring force and fixes the locking comb 110.

Figure 4:
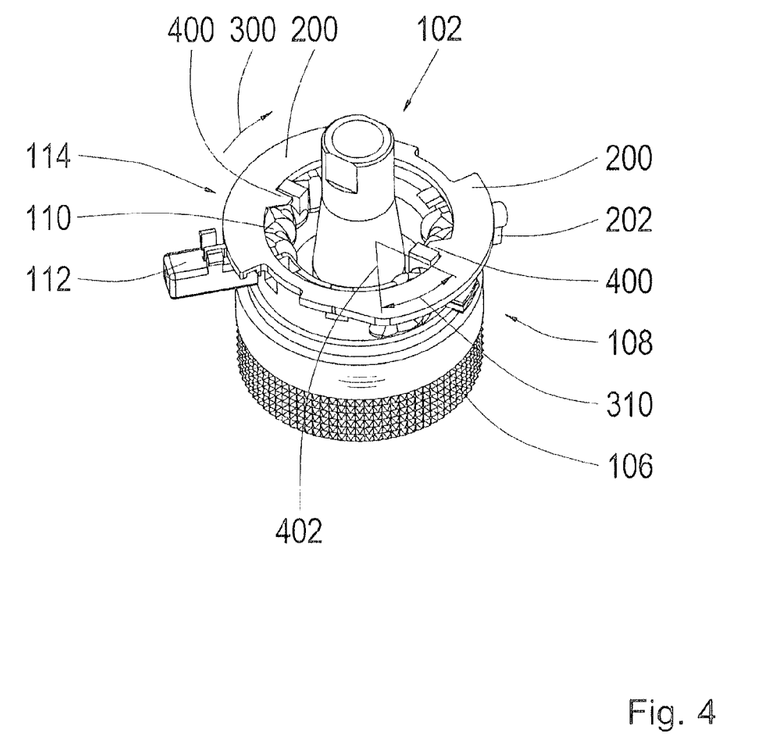
FIG. 4 shows a perspective bottom view of the shifting device of FIG. 2 with retracted locking pin, according to an embodiment of the present invention.

FIG. 4 shows in a further bottom view the shifting device 102 in a functional state in which the locking pin 112 is in the second position. Based on a further rotation of the set collar 114 in the direction of rotation 300, one of the two switching cams 200 has received the projection 202 of the locking pin 112 and thus moved it to the second position in which the locking pin 112 releases the locking comb 110 for rotation. As a result of the further rotation of the set collar 114 by a length of the approach 310, the catch 306 has reached a further catch 306 of the same shape located opposite to it per each stop 308 of the locking comb 110. Always one flat face of the respective stop member 308 and a likewise flat respective counter surface of the respective catch 306 abut each other, thus forming the crosspoint 400 for transmitting the torque of the set collar 114 to the gearshift lever 106. Thus, during the return rotation, the locking mechanism 110 and the reset ring 114 are engaged at the coupling point 400. Since the switching cams 200 arranged on the set collar 114 withdraw the spring-loaded locking pin 112 before turning back the locking mechanism 110, the locking pin 112 is no longer engaged with the locking mechanism 110. By decoupling the locking pin 112 and the locking mechanism 110, the gearshift lever 106 is reset without a disturbing latching noise.

As the diagram in FIG. 4 shows, the approach 310 of the switching cam 200 of the reset ring 114 with respect to a center of the shifting device 102 forms an angle 402 of x°, for example between 30° and 50° to the crosspoint 400 (the length of the approach depends on the specifications). Thus at AutoP, first the locking pin 112 and the locking mechanism 110 decouple. Upon further rotation of the reset ring 114, the locking mechanism 110 is then entrained at the crosspoint 400 and turned back to P. After the gear shift lever 106 has reached the P position 114, the reset ring is returned to its initial position. The locking pin 112 is again put into engagement with the locking mechanism 110.

In the presented rotation circuit 102, with decoupled locking mechanism 110, the gear shift lever 106 can be turned from any position, e.g. R, N or D back to P.

According to further embodiments of the presented shifting device, the number of latching elements used can also be increased. By simultaneously increasing the number of the switching cams 200 on the reset ring 114, also further locking pins 112 can be moved simultaneously.

Figure 5:
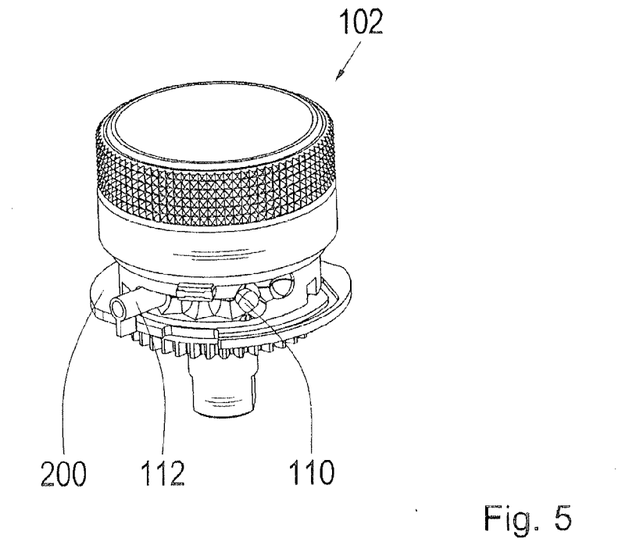
FIG. 5 shows a perspective plan view of the shifting device of FIG. 2 with not retracted locking pin, according to an embodiment of the present invention.
Figure 6:
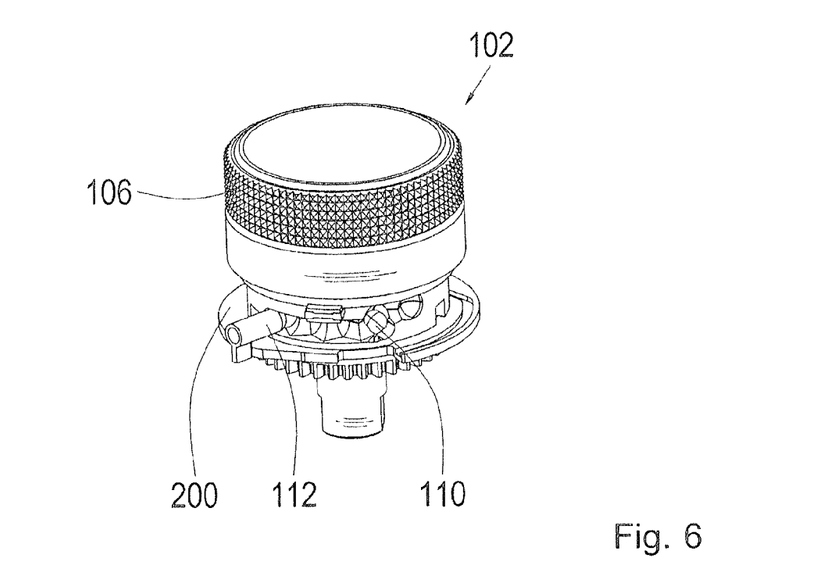
FIG. 6 shows a perspective plan view of the shifting device of FIG. 2 with retracted locking pin, according to an embodiment of the present invention.

FIGS. 5 and 6 show again, with reference to FIGS. 3 and 4, in a perspective view from above, the functional states of the presented shifting device 102 explained in detail. FIG. 5 shows a functional state of the shifting device 102 having a fixed locking mechanism 110. The locking pin 112 is not seated on the control cam 200 and is thus coupled and fixes the locking mechanism 110. FIG. 6 shows a functional state of the shifting device 102, in which the locking pin 112 has been pulled by the cam 200 to the second position in which it is retracted from the locking mechanism 110 and thus decoupled from it. Thus, the locking mechanism 110 and thus also the gearshift lever 106 is released for rotation.

Figure 7:
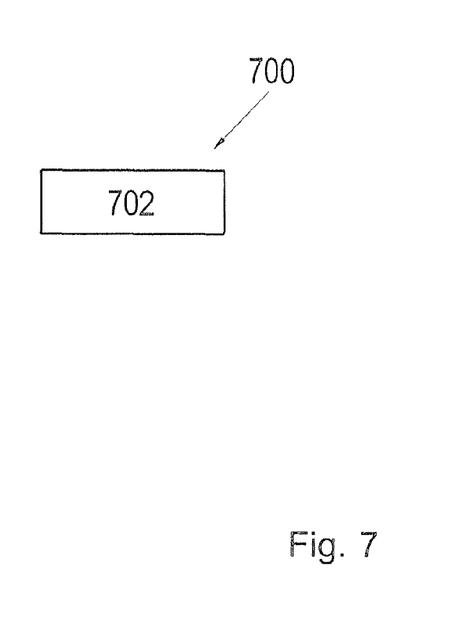
FIG. 7 shows a flow chart of a method for operating a device for shifting an operation element of an automatic transmission of a vehicle to a parking position, according to an embodiment of the present invention.

FIG. 7 shows a flow diagram of one embodiment of a method 700 for operating a device for shifting an operation element of an automatic transmission of a vehicle to a parking position. The device to be operated by the method 700 can be the device explained with reference to the preceding figures which is coupled to an operation element of an automatic transmission of a vehicle and consists of a rotationally mounted locking comb with a stop member, a locking pin for fixing or releasing the locking comb for rotational movement and a rotationally mounted collar set with a switching cam and a catch. The method can be executed by the control unit of the vehicle connected to the device. In step 702, the set collar is rotated via an actuator coupled to the device in a predetermined rotational direction to move by means of the switching cam the locking pin from a first position to a second position, thereby releasing the locking comb and turning it by means of the catch so far that the operation element is brought into the parking position.

The embodiments described and shown in the figures are chosen only by way of example. Different embodiments can be combined wholly or in respect of individual characteristics. An embodiment can also be supplemented by features of another embodiment. Further steps of the invention can be repeated and executed in a sequence other than the sequence described.

If an embodiment includes an "and/or" link between a first feature and a second feature, it can be read so that according to one embodiment, the embodiment comprises both the first feature and the second feature, and according to another embodiment, it comprises only either the first feature or the second feature.

REFERENCE NUMERALS

100 Vehicle
102 Shifting device
104 Automatic transmission
106 Operation element
108 Device for shifting the operation element
110 Locking comb
112 Locking pin
114 Set collar
200 Switching cam
202 Projection
204 Main extension direction of the locking pin
206 Direction of movement of the locking pin to the second position
208 Coupling element
300 Rotation direction of the set collar
302 Initial section of the switching cam
304 End section of the switching cam
306 Catch
308 Stop member
310 Approach
400 Crosspoint
402 Angle of the approach
700 Method for operating a device for shifting an operation element
702 Step of rotating

What is claimed is:

1. A device for shifting an operation element of an automatic transmission of a vehicle to a parking position, the device comprising:
   a rotationally mounted locking comb directly coupled with the operation element with a stop member;
   a locking pin which is formed in a first position to fix the locking comb and in a second position to release the locking comb for a rotational movement; and
   a rotationally mounted set collar with a switching cam and a catch, wherein the switching cam is formed at rotational movement of the set collar to move the locking pin from the first position to the second position, and the catch is formed at a rotational movement of the set collar to entrain the stop member to turn the locking comb for shifting the operation element to the parking position.

2. The device of claim 1, wherein the device further comprises a spring element connected with the locking pin, wherein the switching cam is formed to move the locking pin against the force of the spring element from the first position to the second position.

3. The device of claim 1, wherein the locking comb is arranged between the set collar and the operation element and the locking pin is arranged radially with respect to the locking comb and the set collar and is designed to be moved in a radial direction with respect to the locking comb and the set collar between the first position and the second position.

4. The device of claim 1, wherein the locking pin comprises a projection and is designed to be moved at the rotational movement of the set collar from the first position to the second position by setting the projection on the switching cam.

5. The device of claim 1, wherein the catch and the switching cam are formed on the set collar offset by a predetermined angle in relation to the catch to form an approach of the switching cam.

6. The device of claim 1, wherein the switching cam is formed by a section of the set collar, which is characterized by a larger radial expansion of the set collar than in a remaining section of the set collar, wherein with respect to a direction of the rotational movement of the set collar an initial section of the switching cam is characterized by a beveled first transition between the section and the remaining section, and an end section of the switching cam is characterized by a stepped second transition between the section and the remaining section.

7. The device of claim 1, wherein the device further comprises a coupling element coupling the set collar with an actuator which is designed to transmit a torque of the actuator to the set collar in order to produce the rotational movement of the set collar.

8. The device of claim 1, wherein the set collar comprises at least one further switching cam and at least one further catch.

9. A shifting device for shifting an automatic transmission of a vehicle, the shifting device comprising:
   an operation element that is designed to be shifted between a parking position of the automatic transmission and at least a driving position of the automatic transmission; and
   a device for shifting the operation element comprising:
   a rotationally mounted locking comb directly coupled with the operation element with a stop member;
   a locking pin which is formed in a first position to fix the locking comb and in a second position to release the locking comb for a rotational movement; and
   a rotationally mounted set collar with a switching cam and a catch, wherein the switching cam is formed at rotational movement of the set collar to move the locking pin from the first position to the second position, and the catch is formed at a rotational movement of the set collar to entrain the stop member to turn the locking comb for shifting the operation element to the parking position.

10. A method for operating a device for shifting an operation element of an automatic transmission of a vehicle to a parking position, wherein the device comprises a rotationally mounted locking comb directly coupled with the operation element with a stop member, a locking pin which is designed in a first position to fix the locking comb and in a second position release the locking comb for a rotational movement, and a rotationally mounted set collar with a switching cam and a catch, the method comprising:
   rotating of the set collar to move the locking pin from the first position to the second position by means of the switching cam, and to entrain the stop member by means of the catch in order to turn the locking comb so fat that the operation element is shifted to the parking position.

11. The device of claim 2, wherein the locking comb is arranged between the set collar and the operation element and the locking pin is arranged radially with respect to the locking comb and the set collar and is designed to be moved in radial direction with respect to the locking comb and the set collar between the first position and the second position.

12. The device of claim 2, wherein the locking pin comprises a projection and is designed to be moved at the rotational movement of the set collar from the first position to the second position by setting the projection on the switching cam.

13. The device of claim 3, wherein the locking pin comprises a projection and is designed to be moved at the rotational movement of the set collar from the first position to the second position by setting the projection on the switching cam.

14. The device of claim 2, wherein the catch and the switching cam are formed on the set collar offset by a predetermined angle in relation to the catch to form an approach of the switching cam.

15. The device of claim 3, wherein the catch and the switching cam are formed on the set collar offset by a predetermined angle in relation to the catch to form an approach of the switching cam.

16. The device of claim 4, wherein the catch and the switching cam are formed on the set collar offset by a predetermined angle in relation to the catch to form an approach of the switching cam.

17. The device of claim 2, wherein the switching cam is formed by a section of the set collar, which is characterized by a larger radial expansion of the set collar than in a remaining section of the set collar, wherein with respect to a direction of the rotational movement of the set collar an initial section of the switching cam is characterized by a beveled first transition between the section and the remaining section, and an end section of the switching cam is characterized by a stepped second transition between the section and the remaining section.

18. The device of claim 1, wherein the device further comprises a coupling element coupling the set collar with an actuator which is designed to transmit a torque of the actuator to the set collar in order to produce the rotational movement of the set collar.

19. The device of claim 1, wherein the set collar comprises at least one further switching cam and at least one further catch.

20. The shifting device of claim 9, wherein the device further comprises a spring element connected with the locking pin, wherein the switching cam is formed to move the locking pin against the force of the spring element from the first position to the second position.

* * * * *

UNITED STATES PATENT AND TRADEMARK OFFICE
CERTIFICATE OF CORRECTION

PATENT NO. : 10,100,926 B2
APPLICATION NO. : 15/029755
DATED : October 16, 2018
INVENTOR(S) : Ludger Rake et al.

Page 1 of 1

It is certified that error appears in the above-identified patent and that said Letters Patent is hereby corrected as shown below:

In the Claims

In Column 10, Claim 10, Line 60, delete "fat" and insert --far--.

Signed and Sealed this
Seventh Day of April, 2020

Andrei Iancu
*Director of the United States Patent and Trademark Office*